United States Patent Office 3,614,859
Patented Oct. 26, 1971

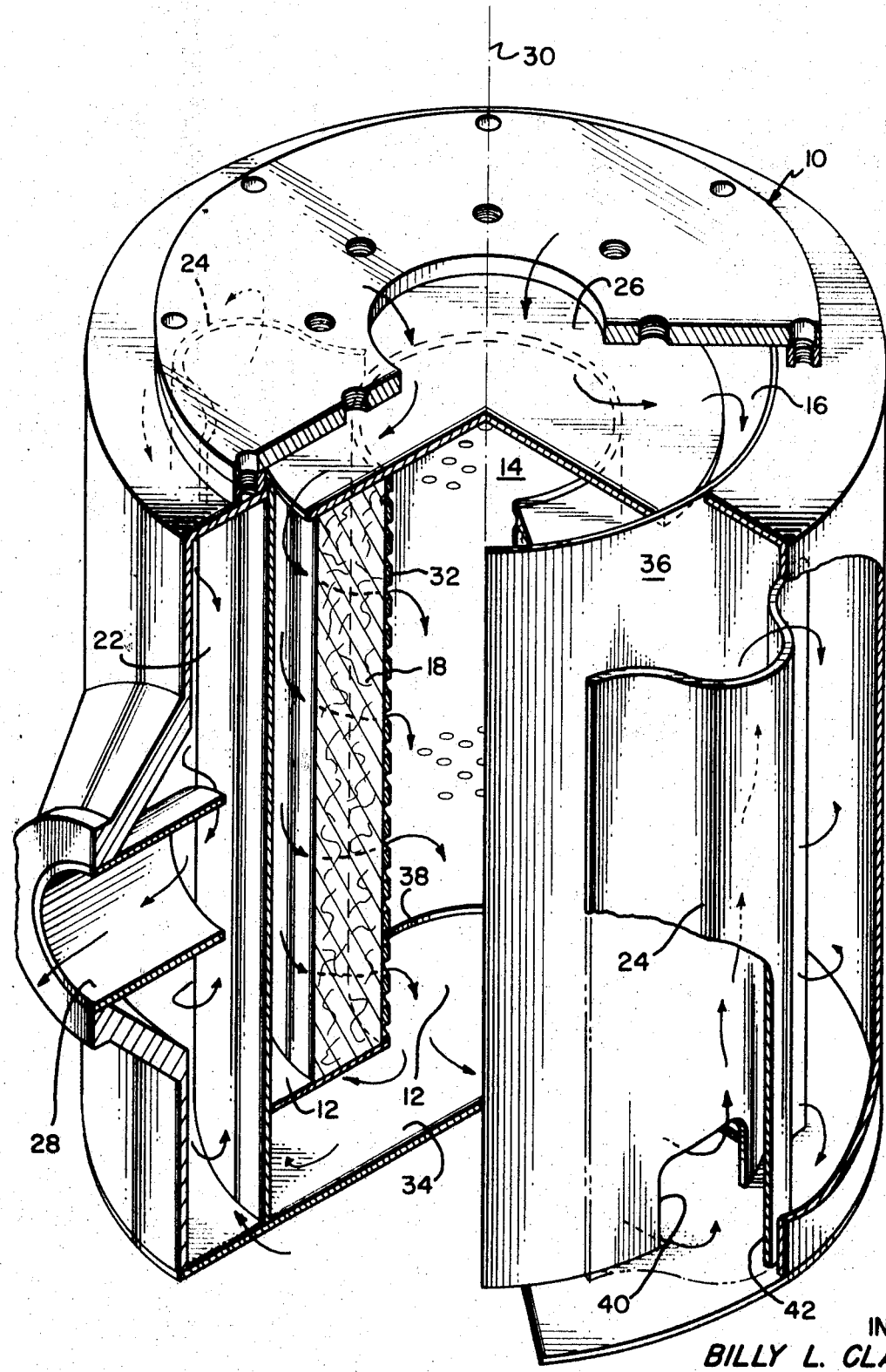

3,614,859
GAS FILTER-SILENCER
Billy L. Clark, Corning, N.Y., assignor to Ingersoll-Rand Company, New York, N.Y.
Filed Nov. 17, 1969, Ser. No. 877,286
Int. Cl. B01d 27/08
U.S. Cl. 55—276
4 Claims

ABSTRACT OF THE DISCLOSURE

A gas filter-silencer of limited size with a plurality of concentric chambers having an interpositioned annular filter. The chambers of one pair thereof are in gas flow communication by way of choke tubes which are structurally and operatively disposed therebetween. The choke tubes divide the filtered gas into parallel paths, each of which extend more than half the axial length of the filter-silencer, to suppress the noise frequencies of the gas.

---

In the prior art it is known to have filter-silencers with tubes or piping disposed to conduct the gas or air a considerable distance to suppress or attenuate the noise frequencies of the gas. However, it has been necessary, heretofore, to provide a structure of considerable dimensions to effect an adequately lengthy travel of the gas therethrough so that the noise suppression might be realized.

It is an object of this invention to provide an improved gas filter-silencer.

It is another object of this invention to provide an improved gas filter-silencer of limited size which nonetheless conducts the gas therethrough in extended paths, more efficiently to effect suppression of noise.

It is another object of this invention to provide a gas filter-silencer of limited dimensions having means for removing foreign matter from the gas and thereafter conducting the filtered gas along adequately lengthy paths, more effectively to attenuate the noise frequencies of the filtered gas.

A feature of this invention comprises the provisioning of a filter silencer comprising a plurality of concentric chambers with an annular filter interpositioned between a first pair of chambers, and choke tubes disposed between a second pair of the chambers.

Further objects and features of this invention will become more apparent by reference to the following description, taken in conjunction with the accompanying figure, a vertical, perspective illustration, partly in cross-section, and with cutaway portions, of an embodiment of a filter-silencer in accordance with the invention.

As shown in the figure, a filter-silencer 10 embodying my invention comprises a plurality of chambers, to wit: a first pair of chambers 12 comprising an inner chamber 14 and an intermediate chamber 16. Chambers 14 and 16 have an annular filter 18 disposed therebetween. The chamber 16 being intermediate an outer chamber 22. A pair of choke conduits or choke tubes 24 extend axially, parallel with the longitudinal axis of the filter-silencer, and are carried by a wall of intermediate chamber 16.

An inlet port 26 admits gas to intermediate chamber 16 for conduct of the gas therefrom, radially, through filter 18 into inner chamber 14. Thereafter the gas is conducted through the choke tubes 24 for silencing purposes to the outer chamber 22. The gas is finally conducted from the outer chamber 22 through a ported outlet adapter 28 for supply of the filtered and silenced gas to an air or gas compressor, pneumatic tube system, pneumatic paving breaker (or such types of gas-using apparatus).

The filter-silencer 10 has an axis defined by the axial centerline 30, and comprises an enclosure 34 formed in the base of the unit. The first pair of chambers 12 and filter 18 are supported on enclosure 34 which has the periphery thereof defined by the inner wall 36 of outer chamber 22. The enclosure 34 has an aperture 38 in the axial center thereof for communicating gas from inner chamber 14 to outer chamber 22 by way of the choke tubes 24. The inner wall 36 has open areas 40 which are in alignment and communication with one end 42 of each of the choke tubes 24.

The choke tubes 24 each extend axially for a distance greater than half the axial length of the filter-silencer 10. In addition, they separate the filtered gas into a plurality of flow paths while channeling the filtered gas the adequately lengthy distance. This extended travel of the filtered gas, occasioned by the positioning and functioning of the choke tubes 24, in cooperation with the concentric chambers 14 and 16, markedly suppresses the noise frequencies of the filtered gas before it is released to the outer chamber 22.

While I have described my invention in connection with a specific embodiment thereof, it is be clearly understood that this is done only by way of example and not as a limitation to the scope of my invention at least as set forth in the objects thereof.

I claim:
1. A gas filter-silencer having a given longitudinal axis; comprising:
    a plurality of chambers concentrically disposed about said axis defined by walls;
    inlet means for admitting gas to a first, intermediate chamber of said plurality via one axial end thereof;
    passage means for passing gas into a second inner chamber and means for exhausting gas from the second, inner chamber of said plurality via an axial end thereof opposite said one end;
    filter means operatively interposed between said first and second chambers and in said passage means for admittance of gas therethrough, from said first chamber to said second chamber, and for filtering said gas; and including
    a third chamber of said plurality, said third chamber defining an outer chamber, and wherein
    said exhausting means includes axially disposed choke conduits of arcuate cross-section, interposed said third chamber, each open only at opposite axial ends thereof, and each communicating between said second and third chambers via passages in the inner wall of the third chamber and for conducting filtered gas therethrough
    and outlet means for removal of filtered gas from said third chamber.
2. The invention, according to claim 1, wherein:
    said first and second chambers cooperate with said filter means to conduct gas through said filter means in a given direction relative to said axis; and
    said choke conduits conduct said filtered gas therethrough in a direction perpendicular to said given direction.
3. The invention, according to claim 1, wherein:
    said third chamber is defined by concentric walls, the wall describing the greater diameter further defining an outer shell of the filter-silencer, and the other wall thereof being cooperative to define a shallow enclosure therewithin and above which enclosure said first chamber and said filter means are supported.
4. The invention, according to claim 3, wherein:
    said enclosure has an aperture in the axial center thereof in communication with said second chamber; and
    said other wall further comprises a peripheral wall of said enclosure, and has relieved areas formed there- in, each one of said areas being in flow communication with one end of one said choke conduits.

References Cited

UNITED STATES PATENTS

| | | | |
|---|---|---|---|
| 1,864,915 | 6/1932 | Kosterman | 181—51 |
| 2,705,546 | 4/1955 | Chaffey | 55—276 |
| 2,801,705 | 8/1957 | Brixius et al. | 55—276 |
| 3,494,114 | 2/1970 | Nelson et al. | 55—510 |

FOREIGN PATENTS 460,234  1/1937  Great Britain _____ 181—53

FRANK W. LUTTER, Primary Examiner
B. NOZICK, Assistant Examiner

U.S. Cl. X.R.
55—510; 181—53